March 20, 1928.  P. MUELLER  1,662,863
GAS STOP SEAL
Filed Oct. 28, 1925
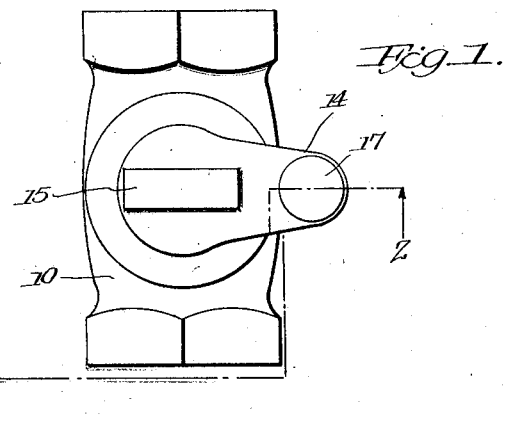
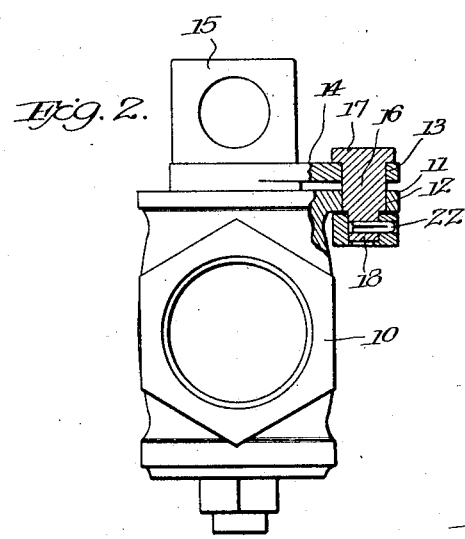
Inventor
Philip Mueller
By Cushman Bryant & Darby
Attorneys Patented Mar. 20, 1928.

1,662,863

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

GAS-STOP SEAL.

Application filed October 28, 1925. Serial No. 65,376.

This invention relates to improvements in locking and sealing means for use on service cocks and the like, and more particularly to a device for positively maintaining the turning key against rotative movement.

An essential feature of the invention consists in irremovably connecting the locking member to a frangible collar by means of a yieldable split pin, so that it will be necessary, when the parts are in locking engagement, to break or mutilate the frangible collar, in order to rotate the turning key.

A further object of the invention relates to the provision of a frangible locking and sealing member which in addition to being inexpensive to produce, is also effective in operation, and which, when set up, securely locks and seals the parts against rotative movement.

Referring to the drawings wherein is illustrated a preferred form of the invention:

Figure 1 is a top plan view of a cock showing the locking device attached thereto.

Figure 2 is a sectional view taken substantially along the line 2—2 of Figure 1.

Figure 3 is a perspective view of the several parts of the lock and seal support.

Figure 4 is a sectional view of a modified form of the invention.

Figure 5 is a sectional view of another modified form of the invention.

Figure 6 is a sectional view of a still further modification.

Referring to the drawings, wherein like numerals indicate like parts in the several views, 10 denotes a gas cock body of well known type, which is provided with a laterally projecting arm or wing 11 having an opening 12, adapted to register with a correspondingly formed opening 13 in the arm 14 of the turning key 15, when the valve is in the closed position.

The turning key 15 is connected to the cock 10 by means of a locking bolt or pin 16, extending through the openings 12 and 13, which register when the arms 11 and 14 are parallel with each other. The locking bolt 16 may be made of iron, steel, or some other suitable metal, and is provided at one end with an enlarged head 17, while its opposite extremity is formed with a reduced stem 18 which receives the collar 19. The collar 19 is preferably composed of any easily frangible material such as lead or the like, and has formed in one wall thereof, a radial opening 20 which will register with a correspondingly formed opening 21 in the stem 18 of the locking bolt when the parts are brought to proper position.

A split pin 22 lying wholly within the openings 20 and 21, secures the locking collar to the bolt, in the manner shown in Figure 2. It will be seen that when the pin 22 is inserted in position, it will be brought into frictional engagement with the wall of the openings 20 and 21, and its outer end will lie within recess 20 in the collar, so as to prevent its removal when once placed in position.

In order to permit rotation of the turning key, relative to the cock body, it will be necessary to break or mutilate the frangible collar 19. To facilitate the destroying of the collar its outer periphery is preferably scored with a series of grooves 23, arranged to receive any suitable tool for breaking the same.

When it is desired to lock and seal the cock 10, the key 15 is turned until the opening 13 in the arm 14 is in alignment with the opening 12 in the arm 11. The locking member 16 is then inserted through these openings in the manner as shown in Figure 2, and the sealing collar 19 is connected to the bolt by means of the split pin 22. It will be seen that in order to operate the key 15 to open the cock 10, it will be necessary to break the frangible collar 19, and remove the bolt 16 from engagement with the arms 11 and 14. Furthermore, should any unauthorized person attempt to open the cock for the purpose of surreptitiously using the fluid passing therethrough, it would be necessary to break the locking member, which could not be done without being detected.

In the form of the invention illustrated in Figure 4, the cock body 24 and the turning key 25 are provided with the laterally extending arms 26 and 27 respectively, each having aligned openings arranged to receive the locking bolt 28. A frangible collar 29, having a lateral opening 30 in one side thereof, is connected to a reduced portion 31 of the locking bolt by means of the split pin 32, which extends through the opening 30, and a correspondingly aligned opening 34 formed in the stem 31. The inner end of the pin 32 is provided with radially projecting lugs 33 arranged to fit into the enlarged recess 35 formed at the inner end of the opening 34. When the pin 32 is inserted in the openings 30 and 34, the lugs 33 will spring into engagement with the shoulder of the recess 35, so as to positively lock the collar to the pin.

Manifestly in order to turn the key 25 relative to the cock 24, it will be first necessary to remove the locking bolt 28 from engagement with the arms 26 and 27, which can only be effected by breaking the frangible collar 29.

In the modification shown in Figure 5, the cock body 36 and the turning key 37 are provided with laterally extending wings 38 and 39 respectively, each of said wings having vertically aligned openings for the reception of the lock bolt 40. The lower end of the bolt 40 beneath the wing 38 has a reduced portion 41 provided with a transverse opening 42. A frangible locking collar 43, which fits on the portion 41, is provided with a radial port 44 and a cut out portion 45 adapted to align with the opening 42. A substantially U-shaped spring member 46 is arranged to be inserted through the port 44 and engage the cut out portion 45 and the walls of the opening 42 to lock the nut to the bolt. It will be noted that the radial port 44 is of smaller diameter than the opening 42 and forms shoulders or abutments 47 for preventing removal of the spring member 46 when the same has been placed in position.

In the form of the invention illustrated in Figure 6, the turning key 48 has a lateral wing 49 arranged to register with a complementary wing 50 on the cock body 51. The wing 50 is preferably provided with a recess 52 in the upper face thereof which receives the lower end of the bolt 53 when the parts are moved to locking position. A frangible locking collar 54 is mounted on the bolt 53 between the wings 49 and 50, and has a radial opening 55 in one side thereof which registers with a similarly formed opening 56 in the bolt 53. The opening 56 preferably terminates at its inner end in an enlarged recess 57 so as to form the shoulders 58 which receive the projections 59 of a split pin 60 and thus positively preventing the removal of the nut from the bolt unless the latter is destroyed or mutilated.

It is to be understood that the forms of the invention herewith shown and described are merely illustrative and not restrictive, and that such changes as are within the range of mechanical skill, may be made without departing from the spirit of the invention and the scope of the appended claims.

I claim:

1. In combination, a locking bolt having a radial opening therethrough, a frangible collar on said bolt having in one side thereof an opening adapted to register with the opening in said bolt, and a yieldable locking member adapted to be inserted through the opening in said collar and lie wholly within said openings for non-rotatably connecting the collar to the bolt.

2. In combination, a locking bolt having a radial opening therein provided with an enlarged recess, a frangible collar on said bolt having an opening in one side thereof adapted to register with the radial opening in said bolt, a yieldable locking member adapted to be inserted through the opening in said collar and lie wholly within said openings, said member provided on its inner end with projecting lugs arranged to engage the recess in the bolt opening for non-rotatably connecting the collar to the bolt.

3. In combination, a locking bolt having a radial opening therethrough, a frangible collar on said bolt having in one side thereof a transverse opening adapted to register with an opening in said bolt, and an expansible and contractable member adapted to be inserted through the opening in said collar and lie wholly within said openings, said member having means coacting with complementary means formed in the wall of the transverse opening in said collar for preventing the removal of said member when once placed in its locked position.

In testimony whereof I have hereunto set my hand.

PHILIP MUELLER.